United States Patent [19]

Komatsu et al.

[11] Patent Number: 4,603,511
[45] Date of Patent: Aug. 5, 1986

[54] GRINDING ROBOT

[75] Inventors: Isamu Komatsu, Sagamihara; Kenkichi Serizawa, Yamato, both of Japan

[73] Assignee: Aida Engineering Limited, Sagamihara, Japan

[21] Appl. No.: 663,700

[22] Filed: Oct. 22, 1984

[30] Foreign Application Priority Data

Nov. 15, 1983 [JP] Japan .................. 58-214661
Dec. 28, 1983 [JP] Japan .................. 58-245973
Dec. 31, 1983 [JP] Japan .................. 58-246443

[51] Int. Cl.⁴ .......................................... B24B 49/00
[52] U.S. Cl. .................... 51/165.71; 51/126; 901/5; 901/15; 901/41
[58] Field of Search .......... 901/3, 5, 15, 37, 41; 51/165.71, 126

[56] References Cited

U.S. PATENT DOCUMENTS

| 335,568 | 2/1886 | Cutler | 51/126 |
| 3,888,049 | 6/1975 | MacSween | 51/126 |
| 4,178,632 | 12/1979 | Anthony | 901/5 |
| 4,242,017 | 12/1980 | De Fazio | 901/41 |
| 4,378,959 | 4/1983 | Susujara | 901/15 |
| 4,445,184 | 4/1984 | Noguchi | 901/15 |
| 4,501,094 | 2/1985 | Veale | 51/165.71 |
| 4,520,597 | 6/1985 | Lindberg | 51/126 |
| 4,523,409 | 6/1985 | De Fazio | 51/165.71 |

OTHER PUBLICATIONS

ASEA News, pp. 1 & 2, dated Sep. 1978.

Primary Examiner—Harold D. Whitehead
Attorney, Agent, or Firm—Holman & Stern

[57] ABSTRACT

A grinding robot of playback system to grind 3-D curved surface is disclosed which is comprised of No. 1 arm being horizontally oscillatable around a vertical axis, No. 2 arm pivoted horizontally oscillatable to the head of said No. 1 arm, fluid cylinder attached vertically to the head of said No. 2 arm, abrasive tool attached freely ascendable/descendable and turnable to the bottom of said fluid cylinder, workpiece-fixing table arranged freely turnable and inclineable from horizontal to vertical below said abrasive tool, and designed to make it possible to trace the 3-D curved-surface profile by constantly pressing down the workpiece perpendicularly toward the same by the action of said fluid cylinder and to perform the 3-D curved-surface's automatic grinding-work with the use of 2-D positional data and also to playback-control a retirement locus of the abrasive tool when retiring it temporarily from work area.

5 Claims, 12 Drawing Figures

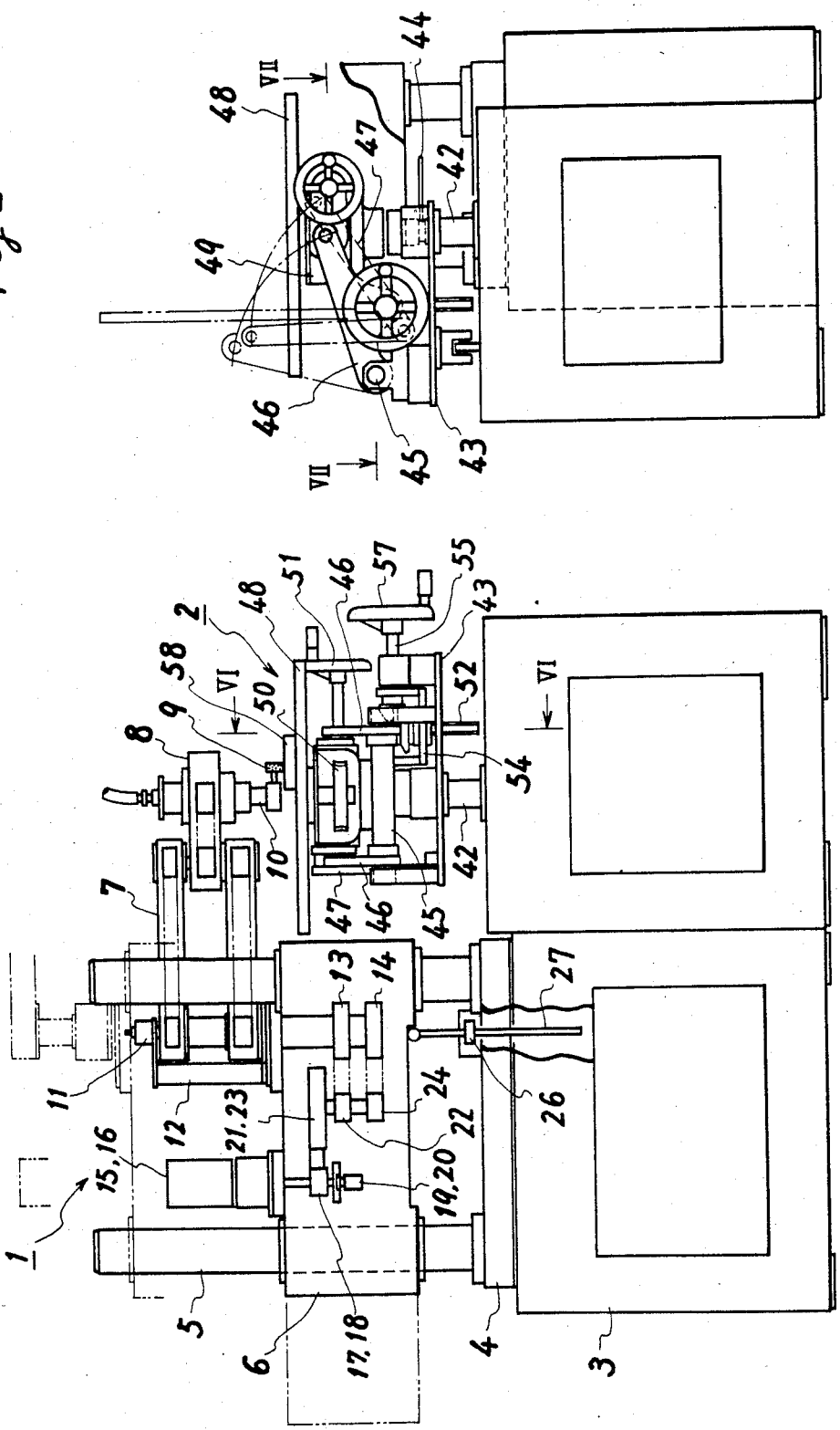

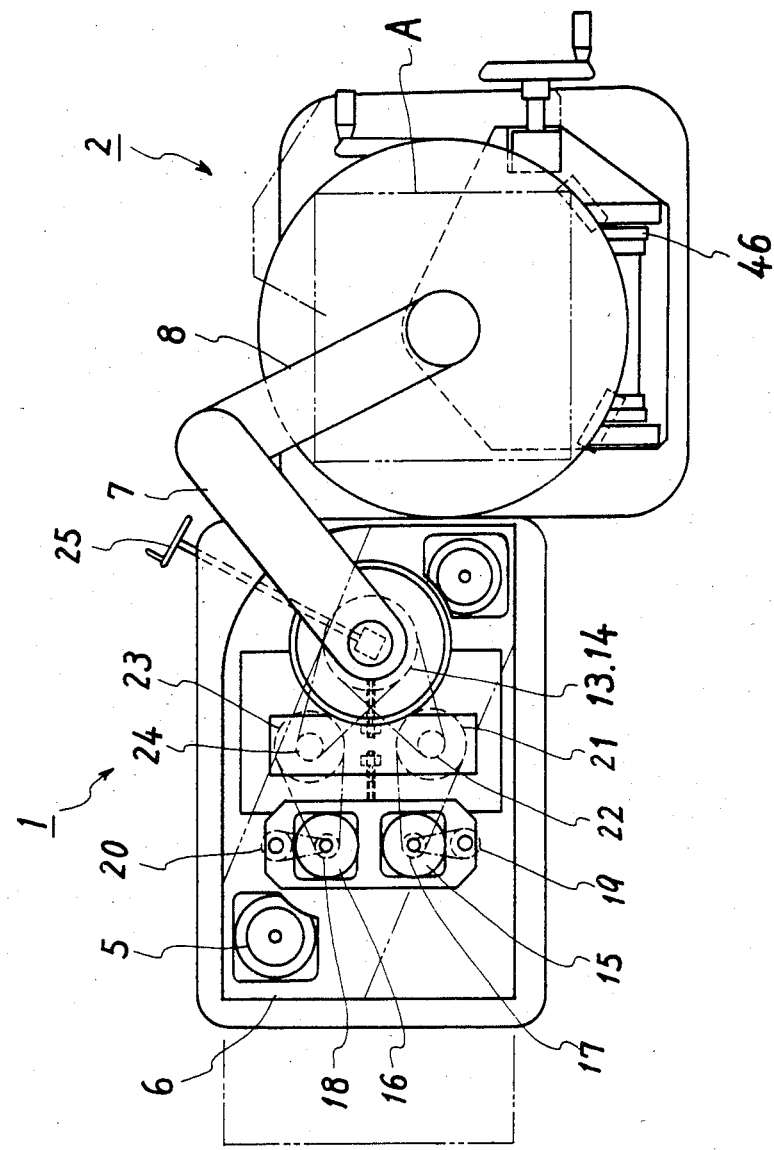

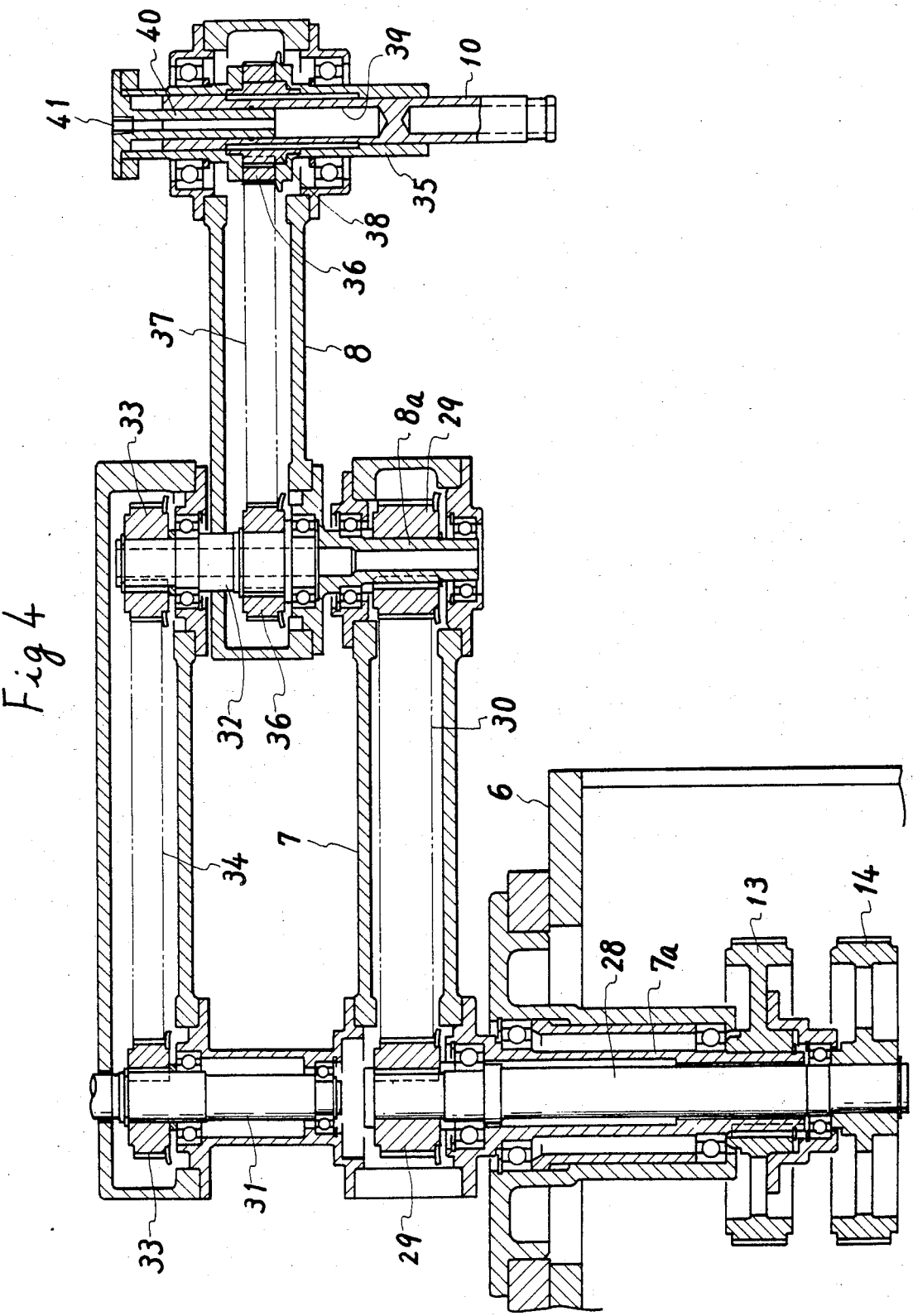

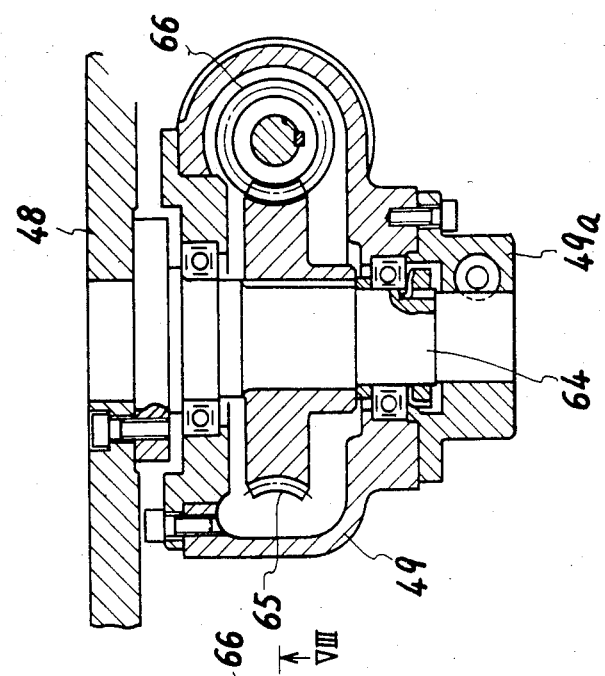
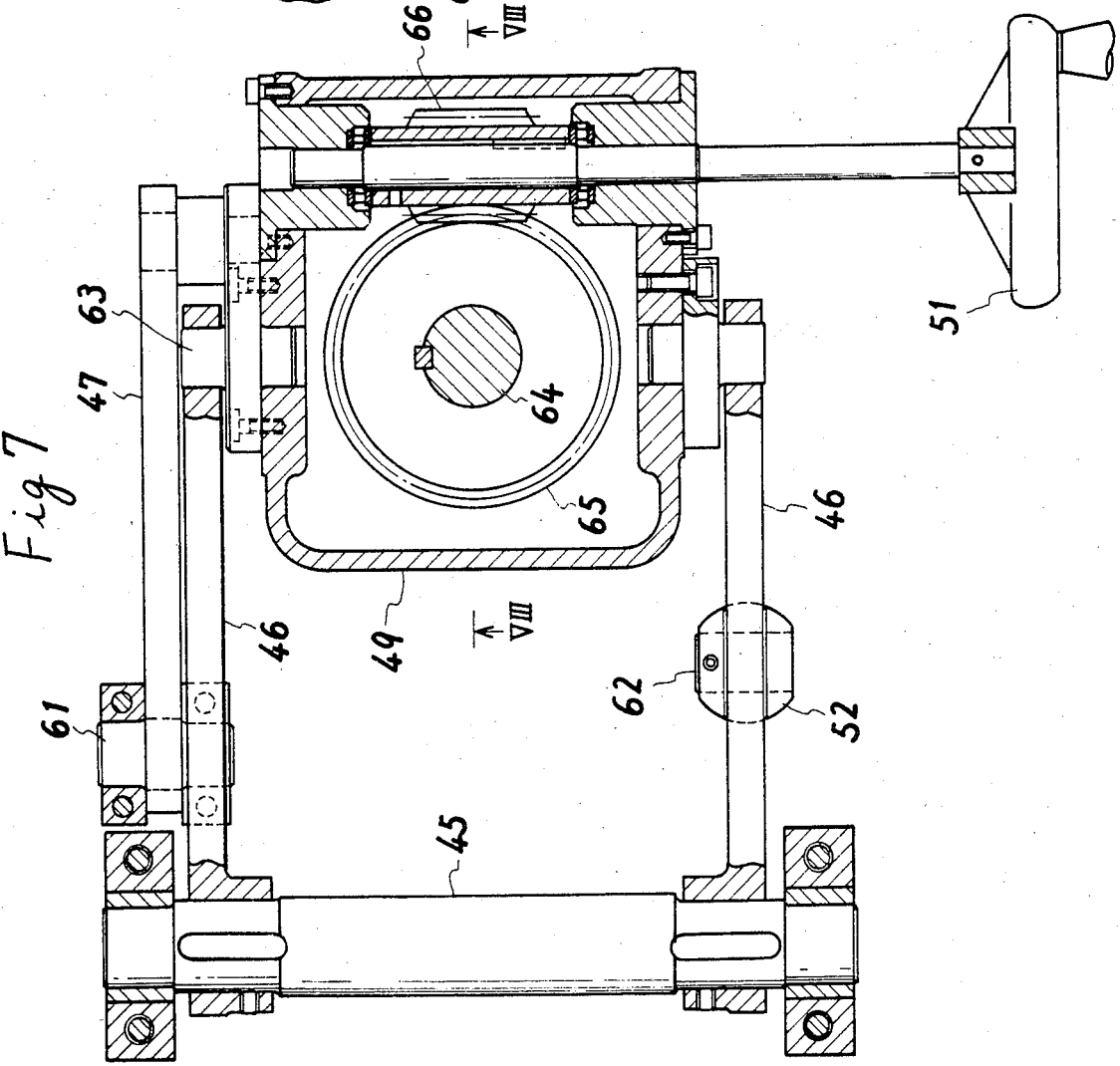

4,603,511

GRINDING ROBOT

FIELD OF THE INVENTION

The present invention relates to a grinding robot and, more particularly to a playback system grinding robot which makes it possible to freely grind a curved surface as seen in various types of dies, etc.

The playback system grinding robot is to automatically carry out a grinding work through such a contrivance that an undermentioned "POSITION" table is built in a memory area of the control system and, when the operator carries a tool of the arm head onto an optional locus at the time of "teaching" operation, said "POSITION" table stores positional data of the tool travelled onto the locus by an appropriate timing method and, when putting the machine into "playback" work, the tool of said arm travels reiteratedly onto the locus learned at the time of "teaching" operation according to the positional data read out of the "POSITION" table.

Formerly, when grinding the curved surface of complicated shape workpieces like the dies, etc., its grinding work has had to be carried out by manual labor requiring a number of processing steps because no appropriate grinding means was yet in the market; besides, such manual works have had many drawbacks in themselves that the worker shows serious mental and physical fatiques and that the worker stagnates in insufficient work efficiency because the work is very intricate and in consequence it must be carried on with the highest circumspection.

Although there were some grinding methods to carry out the grinding work of curved-surface with the use of universal type robots which are possible to store positional data of three dimensional curved-surface and to do playback work in accordance with said data and a certain type of abrasive tool is attached thereto, these universal type robots have also possessed such drawbacks that the robot must be provided with an extensive scale three dimensional storage and sophisticated input program and much time and labor for these arrangements or operations mount up to a large sum considering the scarcity of the practical utility and that an appropriate adapter for providing with the abrasive tool or table is structurally needed.

Further, in the conventional grinding machine, a table device which is generally installed on the grinding robot and used for fixing a die or the like to be ground thereon was of such a type as used in an ordinary machine tool that a 360°-freely rotatable shaft is installed longitudinally on the main body's upper face portion which is prepared to make it possible to turn reciprocatingly around a horizontal axis to the sphere of 90 degrees and to turn the upper face from horizontal to vertical and that possesses a plane surface right-angled to said 360°-freely rotatable shaft. A table of this type, however, had such an unavoidable drawback that the abrasive tool position of grinding robot must be adjusted to match with the position of workpiece on the table each time the grinding work is performed, because it is apt to slip out of the set position when turning a posture of the workpiece from horizontal to vertical.

Furthermore, in a robot of this type, there was such an intricacy that the tool must be retired temporarily to an outside of the work area in order to inspect the result of ground surface at the time of "playback" work and put it back promptly to the original position to restart the work.

By the way, if said intricacy is a mere operation to return the tool to original position, it may be solved simply by storing an information relevant to the original tool position preceding to its retirement in the register area and by returning the tool to the original position at the time of "playback" work.

Although a person having ordinary skill in this art may be possible to easily remind of such process as a known method, it will be impossible to solve some problems of "how to deal with an irregular or unevenness (e.g., concave and convex) of the workpiece surface" or "how to avoid objections on a return course of the tool" and so on. In fact, a solution of these problems has not been found, nor been put to practical use.

SUMMARY OF THE INVENTION

It is accordingly an outstanding object of the present invention to eliminate these drawbacks of conventional art and to provide a new and unique grinding robot which makes it possible to move the abrasive tool automatically and freely to a given direction and also to efficiently conduct the grinding work to the curved surfaces of complicated shape workpiece.

The other object of this invention is to provide such a grinding device that a directional freely rotatable and positionally freely ascendable/descendable abrasive-tool is constantly forced down perpendicularly (i.e. to Z-axis directions of 3-D space) by means of a fluid cylinder to make the tool conduct a profiling of the curved-surface's concave-convex portions and thereby enables performing the grinding work of the three dimensional curved-surface with the use of two dimensional position data.

Another object of the present invention is to provide an efficient grinding robot having such a structure suitable for the grinding work that a large-scale three dimensional storage and sophisticated input program like a universal type 3-D playback system robot are entirely disused.

Yet another object of the present invention is to provide a table device having the foregoing character which enables inclining from horizontal to vertical by such a contrivance that a housing provided with a table being directionally freely rotatable is supported by means of linkages arranged in combination with each other on a turntable which is turnable 90 degrees horizontally and a positional change of workpiece on said table is minimized by oscillating said linkages.

More another object of this invention is to provide a tool retiring device having the foregoing character that, in such a case where retiring the tool in the course of "playback" work in order to carry out an inspection of the result of ground surface and reopening said "playback" work, makes it possible to return the tool to original position and to enter into operation quickly while evading the concave & convex on the workpiece surface or the objections on the tool returning course ingeniously after completion of the inspection.

Still another object of the invention is to provide such a type of tool retiring device as possible to conduct "playback" of the abrasive tool's travelling locus likewise with the use of two dimensional position table when retiring the tool to its retiring position.

In short, the tool retiring device according to the present invention is so contrived that an auxiliary area is assigned in advance in the two dimensional "POSI- TION" table which the playback system grinding device has to possess intrinsically and, when retiring the tool, its original position is initially stored and the retiring course is then stored in said auxiliary area inside said two dimensional "POSITION" table in accordance with the selfsame operation as that learned by teaching operation and finally the tool is returned to original position according to the identical operation with that of the "playback" work.

BRIEF DESCRIPTION OF THE DRAWINGS

FIG. 1 is a front elevation view, partially in section, of the embodiment according to the present invention, FIG. 2 is a partially sectioned right-side elevation view of the embodiment in FIG. 1, FIG. 3 is a plan of the embodiment according to the present invention, FIG. 4 is a longitudinally sectioned elevation view of the principal part of arm portion, FIG. 7 is a sectional view of the embodiment taken along line VII—VII in FIG. 2, FIG. 8 is a sectional view of the embodiment taken along line VIII—VIII in FIG. 7.

DETAILED DESCRIPTION OF THE INVENTION

Figure 5:
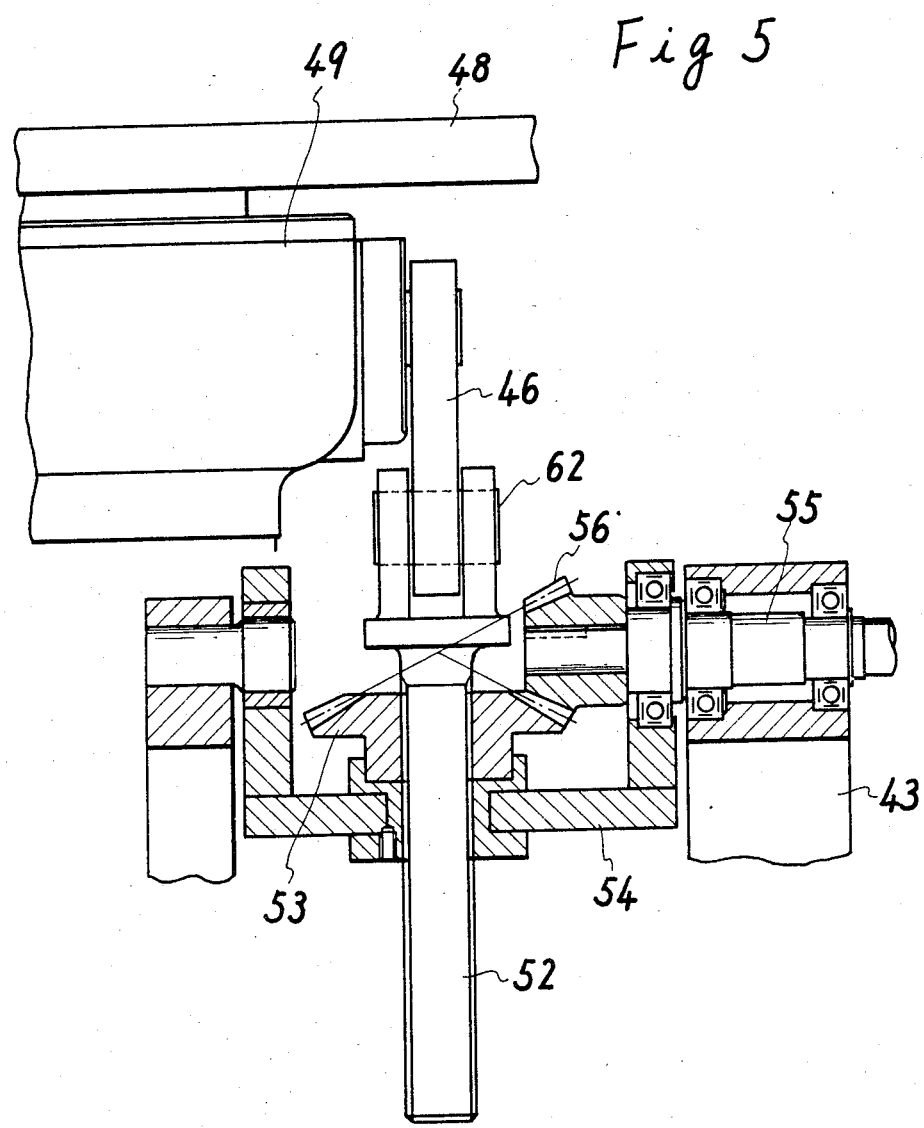
FIG. 5 is a longitudinally sectioned partial elevation view of the table inclination drive unit.

The present invention will now be described in more detail as for several embodiments in conjunction with the accompanying drawings.

Referring to FIGS. 1, 2 and 3, the grinding robot according to the present invention is illustrated therein.

The grinding robot is, in a broad way, composed of a tool driving device (1) and a table device (2) arranged in the proximity of said tool driving device. A bed (3) of said tool driving device (1) is provided with a moving base (4) as progressive to or retrogressive from said table device (2). On the moving base (4), two guide bars (5,5) are perpendicularly arranged and also a lift case (6) guided by said guide bars (5, 5) is mounted to be freely ascendable and descendable. On the lift case (6), No. 1 arm (7) which is separated in two head portions, i.e. made up in a semi-square configuration is fitted freely rotatable with a vertical direction as the axis of rotation. No. 2 arm (8) is fitted between said upper and lower two head portions of No. 1 arm(7) and projected horizontally therefrom to be freely turnable on the horizontal plane. A vertical shaft (10) holding an abrasive tool (9) at its end portion is attached freely rotatable to a head portion of No. 2 arm (8). A tool driving motor (11) making it possible to turn the vertical shaft (10) reciprocatingly to the scope of 90 degrees is installed on the upper portion of the axis of No. 1 arm (7), i.e., on the upper portion of a support (12) standing on the lift case (6). For detailed structure of the arm portion, refer to its explanation to be noted later. A pair of pulleys (13, 14) to facilitate turning of No. 1 arm (7) and No. 2 arm (8) respectively are attached to the axis which extends from No. 1 arm (7) to the inside of lift case (6). Also, a pair of motors (15, 16) to drive No. 1 arm (7) and No. 2 arm (8) respectively are mounted with their output shaft sides down on the lift case (6) and, pulleys (17, 18) are attached to each output shaft of said motors.

In addition to the above, rotary encoders (19, 20) are connected to each output shaft of said motors (15, 16). The Lift case (6) is provided with intermediate shafts at each position corresponding to the mount positions of motors (15, 16) and, pulleys (21,22) are fitted between pulleys (13) and (17) of said intermediate shaft, and further pulleys (23,24) are fitted between pulleys (14) and (18) of said intermediate shaft. These pulleys are connected with toothed belts respectively.

The ascending and descending operation of the lift case (6) can be carried out by a lift handle (25) fitted on the moving base (4) as shown in FIG. 3, and more particularly, by ascending and descending movements of a screw bar (27) screwcoupled with a female screw of the worm wheel (26), shown in FIG. 1, which screw-couples also with a worm of the shaft of lift handle (25).

Referring then to FIG. 4, the structures of No. 1 arm (7) and No. 2 arm (8) are illustrated therein. As can be understood from FIG. 4, a shaft (7a) of No. 1 arm (7) is inserted freely rotatable into the lift case (6).

A pulley (13) is fixed to said shaft (7a) so as to turn No. 1 arm (7). Also, a pulley (14) is attached to a shaft (28) which is inserted freely rotatable and concentrically with the shaft (7a) into the same in order to turn No. 2 arm (8). A shaft portion (8a) of No. 2 arm (8) is supported freely rotatable at the lower head portion of No. 1 arm (7).

Pulleys (29,29) with an equidiameter are attached to an axis (28) and the shaft portion (8a) respectively, and connected with a toothed belt (30). An axis (31) is fitted to No. 1 arm (7) freely rotatable and concentrically with the axis (28) on its upper portion, and directly connected to an output shaft of the aforesaid tool driving motor (11). No. 2 arm (8) is supported by an end of the axis (32) freely rotatable and concentrically with the shaft portion (8a). Another end of the axis (32) is supported freely rotatable by No. 1 arm (7) at its upper head portion. A pair of pulleys (33, 33) with an equidiameter are fixed to the axes (31) and (32) respectively and connected with a toothed belt (34). No. 2 arm is provided with a cylindrical shaft (35) to be freely rotatable at its head portion and a pair of pulleys (36, 36) with an equidiameter are respectively attached to the cylindrical shaft (35) and axis (32) and interconnected with a toothed belt (37).

The vertical shaft (10) arrested its swivel by a sliding key (38) is inserted in freely ascendable/descendable and descent-limit-defined condition into said cylindrical shaft (35). The vertical shaft (10) has an upper-end-face-opened cylinder (39), and a piston (40) suited this cylinder (39) is fixed on the upper portion of the aforesaid cylindrical shaft (35). The piston (40) is provided in its center hole portion with an air vent port (41), in which an appropriate pipe with a rotary joint is arranged (unillustrated).

Supplying a compressed air into this air vent port (41) will make it possible to provide a downward pressing power for the vertical shaft (10).

Referring then to FIGS. 1, 2, 6 and 7, a main axis (42) standing on a bed (60) of the table device (2) is illustrated therein. A turntable (43) with casters is fitted to said main axis (42) rotatably 90 degrees counterclockwise from the position illustrated in these figures in view of the overhead. This turntable (43) can be fixed by a handle (44). The turntable (43) is provided with a horizontal shaft (45) in a freely rotatable condition at a certain distance from the main axis (42) and a pair of links (46, 46) extending in parallel to each other and having each lug member portion are attached to said horizontal shaft (45).

A link (47) which is arranged in parallel to the horizontal shaft (45) and at a slightly lower position than that of the horizontal shaft (45) and joined rotatably to the turntable (43) at its one end by a pin (61) located slightly near the main axis (42) is installed at the outside of one of the aforesaid links (46, 46).

Figure 6:
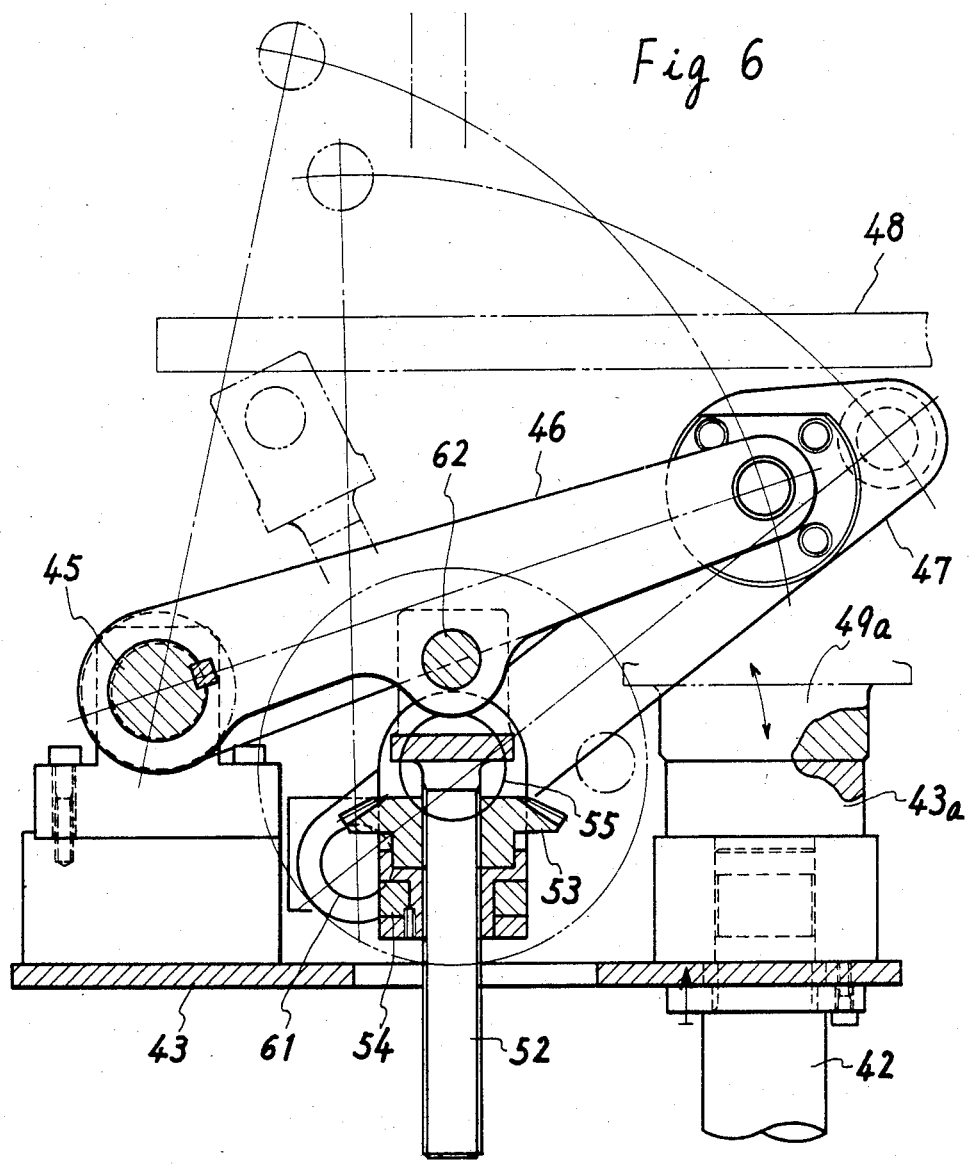
FIG. 6 is a sectional view of the embodiment taken along line VI—VI in FIG. 1.

At another ends of said two lug links (46, 46), a housing (49) is supported freely rotatable on a space between them by means of a pair of pins (63, 63) and, at a certain position of the housing (49) where is slightly apart from the pivot part of the housing (49), another end of the aforesaid link (47) is pivotably connected thereto, as shown in FIGS. 2 and 6.

A forked portion of the screw bar (52) is pivoted by means of a pin (62) to a lug portion of one of the lug links (46, 46) as shown in FIGS. 6 and 7.

A bevel gear (53) centering in a female screw connecting to said screw bar (52) is freely rotatable supported by oscillating plate (54). The oscillating plate (54) is attached freely rotatable to a supporting shaft (55) supported freely rotatable on the turntable (43) in parallel to the horizontal shaft (45).

This supporting shaft (55) is so set up that the screw bar (52) is positioned perpendicularly at the state where the upper face of housing (49), shown by FIGS. 2 and 6, comes to horizontal. As shown in FIG. 1, a bevel gear (56) engaging with a mated bevel gear (53) is fixed to one end of the supporting shaft (55) and an inclinable handle (57) is attached to another end of the same.

Referring then to FIGS. 1, 2, 7 and 8, the housing (49) is illustrated therein which is provided to be freely rotatable with a rotating shaft (64) arranged at right angles to the upper face of the housing (49) and a table (48) is fixed on this rotating shaft (64). A worm wheel (65) is attached to the rotating shaft (64) inserted into the housing (49). Another shaft having a worm (66) gearing with the worm wheel (65) is attached freely rotatable to the hoising (49) and a rotating handle (51) is attached to an end of said shaft. The workpiece (58) is located on the table (48) to grind its upper face by means of the abrasive tool (9).

Figure 9:
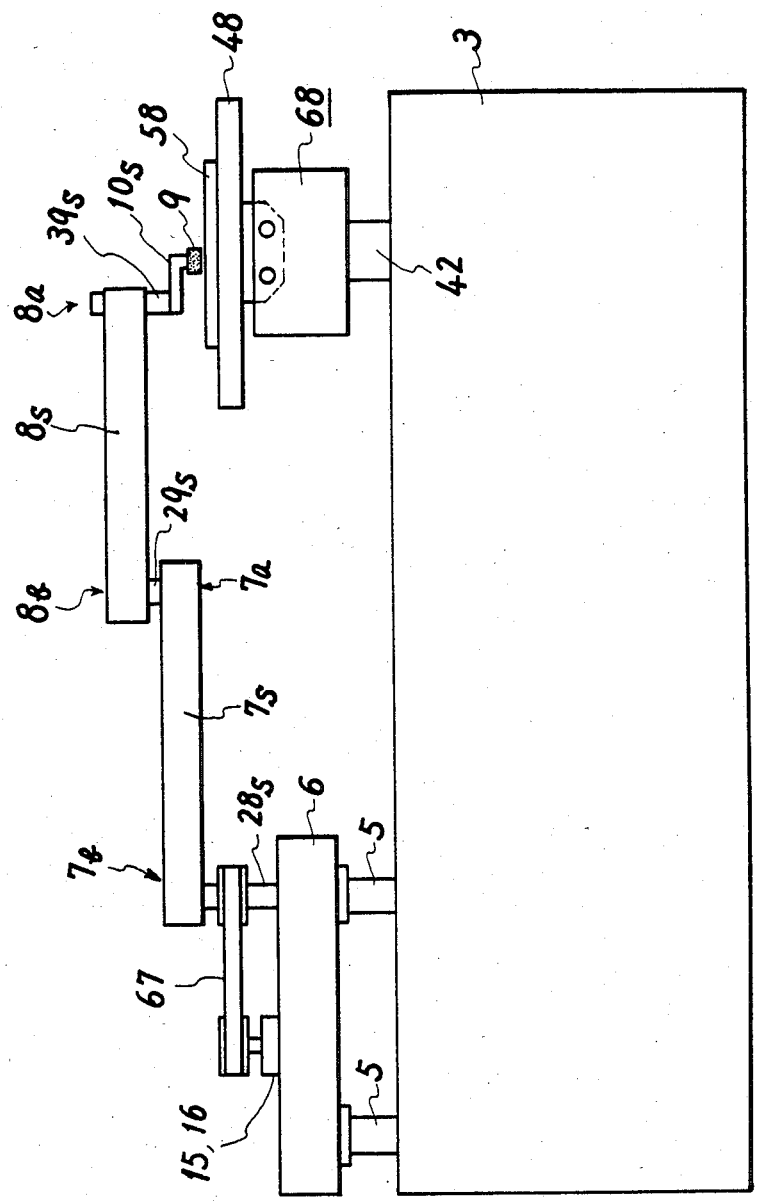
FIG. 9 is a schematic structure diagram of the grinding robot relating to another embodiment of the present invention.

Referring then to FIG. 9, a schematic diagram of the grinding robot relating to another embodiment of the present invention is illustrated therein.

Initially, two guide bars (5, 5) will be seen therein, which stand on the bed (3) to make the ascendable/descendable lift case (6) guide perpendicularly by this guide bars (5,5).

On the lift case (6), No. 1 arm (7S) is pivoted freely rotatable by support shaft (28s). Also, No. 2 arm (8s) is pivoted freely rotatable by a support shaft (29s) to the head portion (7a) of No. 1 arm (7s). On the head portion (8a) of No. 2 arm (8s), a tool ascend-/descending fluid-powered double-action cylinder (39s) is attached perpendicularly thereto and the abrasive tool (9) is attached to a bottom portion of said double-action cylinder (39s) through a power transmission mechanism (10s).

Figure 12:
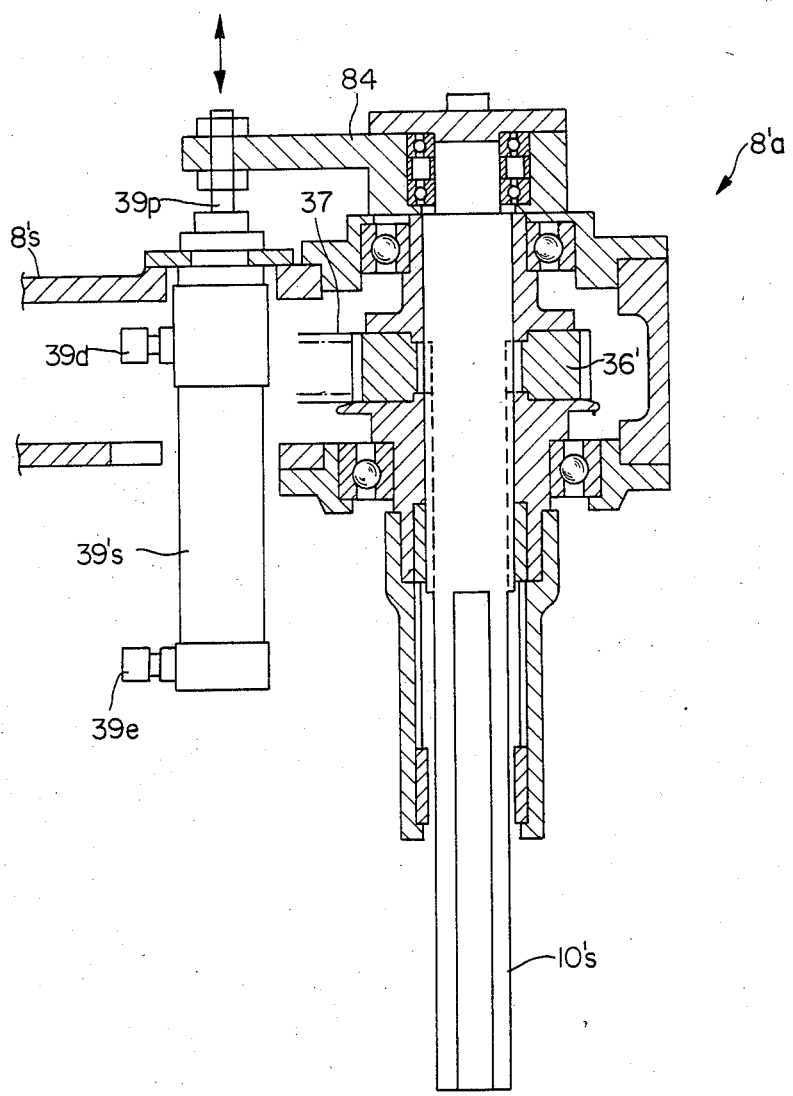
FIG. 12 is a sectional view of the arm head provided with a fluid cylinder.

Another embodiment of the present invention relating to a detailed structure of the aforesaid head portion (8a) of No. 2 arm (8s) is illustrated in FIG. 12.

Referring to FIG. 12, a vertical shaft (10s') to which the abrasive tool (9) (unillustrated) is fitted is attached freely rotatable to a head portion (8a') of No. 2 arm (8s'). Pulleys (36') having each an equidiameter which are arrested their rotations to the circumferential direction by a sliding key and are freely slidable to the axial direction are attached to said vertical shaft (10s') and designed to be driven with a toothed belt (37).

On the upper end of the vertical shaft (10s'), an ascending-descending bracket (84) is arranged in a freely turnable condition. A tool ascending/descending fluid-powered double-action cylinder (39s') is arranged perpendicularly at said head portion (8a') of No. 2 arm (8s') in parallel to the aforesaid vertical shaft (10s'). And, a vertically moving piston (39p) projecting from said double-action cylinder is attached fixedly to an end of aforesaid ascending-descending bracktet (84).

Two fluid vents (39d) and (39e) are fitted to the double-action cylinder (39s'). Once a fluid is supplied to the lower fluid vent (39e), the piston (39p) will rise and at the same time the vertical shaft(10s') will rise together with the ascending-descending bracket (84) and the abrasive tool (9) will also rise naturally.

Also, supplying a fluid to the upper fluid vent (39d), the piston (39p), vertical shaft (10s') and abrasive tool (9) will go down simultaneously.

In this connection, the vertical shaft (10s') is designed to be freely rotatable to the circumferential direction by means of a pulley (36') and a toothed belt (37) irrespective of the abovementioned ascending/descending motions.

Incidentally, we may remark that a "shoulder" portion used in the following pages means a shaft portion (7b) of No. 1 arm and an "elbow" portion means a shaft portion (8b) of No. 2 arm.

The worktable (48) is supported by a driving device (68) to give a slope to said worktable (48) on the main axis (42) from horizontal to vertical. This driving device (68) is unillustrated in the drawings.

This playback system grinding robot is of a polar coordinate system having a certain degree of freedom in the portions of shoulder (7b) and elbow (8b), and, a positioning operation of the abrasive tool (9) can be accomplished by rotating No. 1 arm (7s) with the shoulder portion (7b) as a center of rotation and likewise No. 2 arm (8s) with the elbow portion (8b) as a center of rotation respectively. No. 1 arm (7s) is driven by the motor (15) through a toothed belt (67) and No. 2 arm (8s) is driven by the motor (16) likewise.

Figure 10:
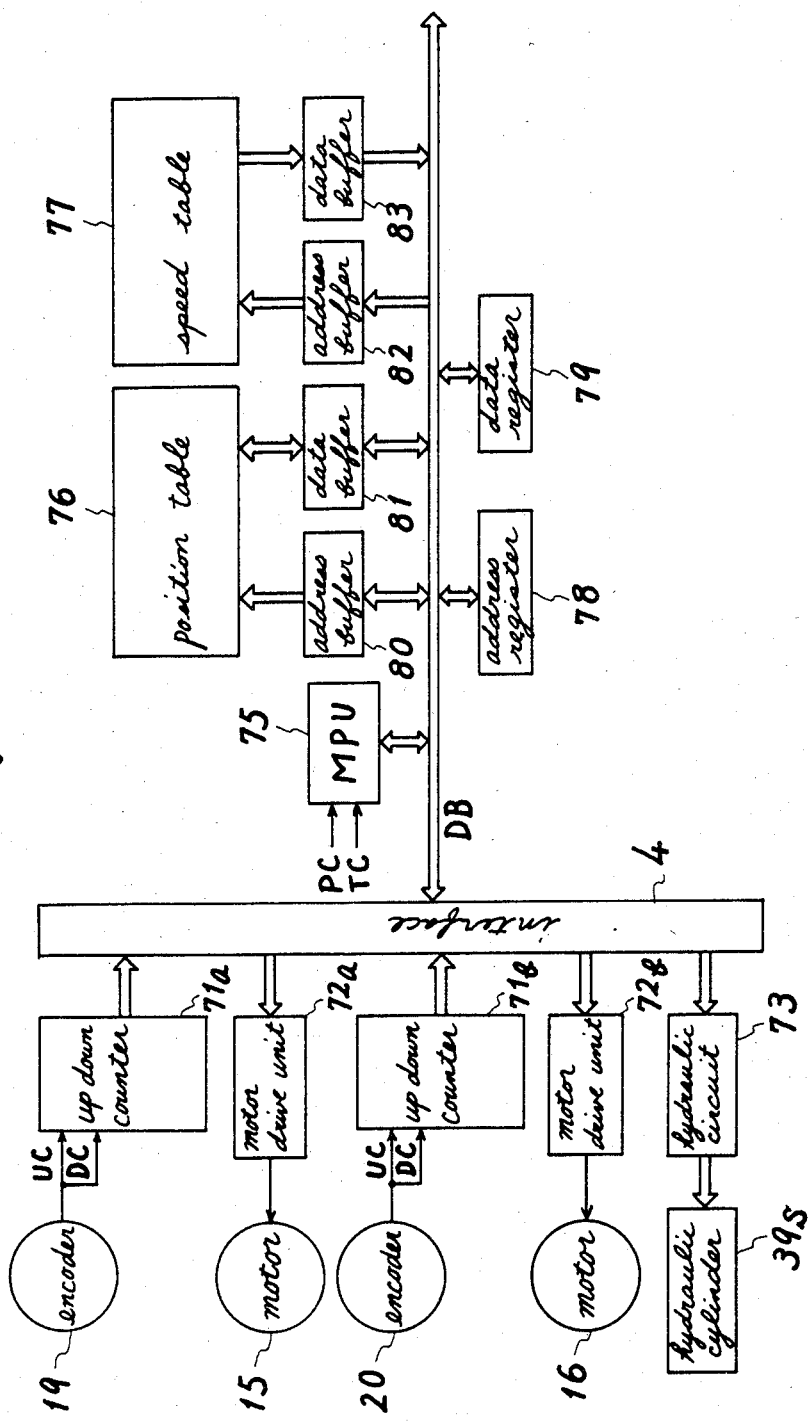
FIG. 10 is a block diagram showing an example of the control system in the grinding robot according to the present invention.

Referring then to FIG. 10, a control system of the present invention is illustrated therein.

In FIG. 10, a reference numeral (15) denotes a motor for driving No. 1 arm shown in FIG. 9 and also a reference numeral (19) shows an encoder connected to the shoulder portion (7b). The encoder (19) is designed to emit two phases clock pulses (i.e. of the plus(+) and minus(−) directions) each time No. 1 arm (7s) rotates to a fixed angle with the shoulder portion (7b) as a center of rotation and the thus generated clock pulses are then sent to an up-down counter (71a) and subjected to addition and subtraction processes therein. Accordingly, an outcome calculated in the up-down counter (71a) shows a rotational angle of No. 1 arm (7s).

A reference numeral (72a) denotes a motor drive unit which gives an excitation pattern to the motor (15) and drives its pattern.

Incidentally, as each function of the motor (16), encoder (20), up-down counter (71B) and motor drive unit (72b) is all the same as those of motor (15), encoder (19), up-down counter (71a) and motor drive unit (72a), except some points concerning the motion of No. 2 arm, an overlapped explanation will be omitted here.

A reference numeral (73) denotes a fluid circuit to drive a tool ascending/descending fluid-powered cylinder (39s).

These mechanisms are connected to a control system through an interface (74).

This control system is integrated with components built a microprocessor (75) in a heart of the unit, and more particularly, set up with a "position" table (76) which is composed of "RAM" storing the positional data of abrasive tool and a "speed" table which is composed of "ROM" storing the revolutionary speed of the motor and an address register (78) storing an address read out of the "position" table (76) at the time of tool retirement as well as a data register (79) storing the positional data assessed from "position" table (76) at the time of tool retirement.

Incidentally, a reference numeral (80) is an address buffer holding an address in the "position" table, and a reference numeral (81) is a data buffer holding the positional data accessed from "position" table (76) and, (82) is an address buffer holding an address read out of the "speed" table (77) and, (83) is a data buffer holding the speed data accessed from the "speed" table.

The present invention will then be described mainly as for an action of the grinding robot in connection with the accompanying drawings.

Initially, let it be supposed that a certain workpiece (58) is positioned at the table (48) and said table (48) is then inclined by inclination handle (57) in order to oppose a face of workpiece to be ground to the abrasive tool (9) and the table (48) is next turned and positioned by the rotating handle (51). As occasion demands, an inclinatory direction of the table (48) can be changed by turning the turntable (43).

Next, a certain rotational angle is given respectively to the motors (15) and (16) in order to rotate No. 1 arm (7) and No. 2 arm (8) simultaneously or independently to the extent of a fixed angle, and the respective rotational angle data of No. 1 arm (7) and No. 2 arm (8) are fed back to the control device through the rotary encoders (19, 20) and then these rotational angle data of both arms are compared with those of motors and, the two are controlled to accord each other.

In this way, setting of the rotational angles of No. 1 arm (7) and No. 2 arm (8) respectively to the max. 120° will make it possible to freely move the abrasive tool (9) within the range as shown in FIG. 3—(A). At this time, the rotational angle data to be sent to the motors (15) and (16) are naturally changed according to a size of grinding area of the workpiece (58). Starting now the motors (15) and (16), they will repeat a clockwise rotation and a counterclockwise rotation alternately each time the motors reach the respective set angle limits and in consequence Nos. 1 and 2 arms (7, 8) will swing reciprocatingly within a given range, thereby enabling the abrasive tool td in consequence Nos.1 and 2 arms (7, 8) will swing reciprocatingly within a given range, thereby enabling the abrasive tool to grind a face of the workpiece (58).

Next, the present invention will be described in more detail as for a playback function of the grinding robot in conjunction with a block diagram of the control system in FIG. 10.

Initially, the positional data inputted successively at the time of "teaching" operation are stored in the "POSITION" table (76) in regular order from No. 0 address and, the microprocessor (75) acts to add "1" to the contents of the address buffer (80) through the data bus (DB) every time the playback clock pulse (PC) is generated and to access successively the positional data stored in the relevant address in the "POSITION" table.

Furthermore, the microprocessor (75) acts to calculate a variation volume of the positional data accessed in this way, and to determine the address in the "SPEED" table (77) in accordance with the thus calculated variation volume and to access the speed data from the "SPEED" table (77).

In this connection, the speed data corresponding to the variation volume of positional data are in advance registered in the "SPEED" table; to put it concretely, the more the variation volume of the positional data becomes greater, the more the specified speed becomes faster and on the contrary, the less the variation volume of the positional data becomes smaller, the less the specified speed becomes slower.

And, the speed data read out of the "SPEED" table in this way are sent through the interface (74) to the motor drive units (72a) and (72b), which determine the excitation patterns of the motors (15) and (16) in accordance with the specified speed.

Furthermore, in these processes, the micriprocessor (75) puts out the positional feedback signals according to the counted values of the up-down counters (71a) and (71b) which are successively renewed by "UP"-clock pulse (UC) and "DOWN"-clock pulse (DC) emitted from the encoders (19) and (20).

In this way, the abrasive tool (9) carries on "playback" operation faithfully according to the positional data obtained at the time of "teaching" operation.

The present invention will then be referred to an aspect of grinding work by way of only an example. Supplying a certain pressure of compressed air now into the air vent (41) shown in FIG. 4, the abrasive tool (9) will start to grind while holding down the workpiece (58) with a given pressure. In this case, using the tool ascending/descending fluid-powered double-action cylinder (39s) as shown in FIG. 9, it is possible to press down the abrasive tool (9) to the workpiece (58) while adversely applying a pressure balanced to a weight of the abrasive tool (9); besides, it is also possible to freely retire or return the abrasive tool (9) from or to the workpiece surface.

Further, when carrying out the grinding work by a method of linearly reciprocating movement, the vertical shaft (10) provided with the abrasive tool (9) can be changed its direction to the extent of 90 degrees by operating the tool drive motor (11), so that the abrasive tool (9) can be directed to optimal direction according to the motions of Nos. 1 and 2 arms (7, 8).

Furthermore, when carrying out a rotary grind work, put the tool drive motor (11) into consecutively running the rotary grind work will then be accomplished satisfactorily.

Incidentally, we may remark that the grinding efficiency can be enhanced more and more if an abrasive tool suited a grind work of the curved surface and an abrasive tool suited a grind work of the plane surface are each used timely at proper portion of the workpiece.

The present invention will then be described in further detail as for the table device of the grinding robot by reference to the accompanying drawings.

Initially, when the operator intends to incline the table (48), operate the inclination handle (57) shown in FIG. 1 and rise the screw bar (52) upward by rotating a bevel gear (53) shown in FIG. 6 through a support shaft (55) and a bevel gear (56). The link (47) will then start to turn due to an oscillation of the lug link (46) rised upward by the screw bar (52), thus providing a rightward inclination to the table (48) together with the housing (49) due to the aforesaid resultant factors. At this time the screw bar (52) and the bevel gear (53) act to follow up to the oscillation of the aforementioned oscillation plate (54) turning around the support shaft (55) and then to the oscillation of the lug link (46).

The table (48) can be inclined optionally within the angular range of 90 degrees from horizontal to perpendicular position as shown by two-dot chain line. At this time, namely, when the table (48) is in horizontal position, a shaft end washer (49a) of the rotating shaft (64) comes to contact to a pedestal (43a) arranged at the head of main axis (42). In this way, the position of the workpiece (58) fixed on the table (48) is almost not changed by a cooperative function of the lug link (46) and link (47) even if the table (48) is inclined; besides, a positional adjustment of the abrasive tool (9) can be facilitated.

To turn the table (48), operate the turning handle (51), it will then be possible to turn the table optionally within the range of 360°.

Also, to change an inclinatory direction of the table (48), initially, loosen the handle (44) shown in FIG. 2 and then turn the turntable (43) optionally around the main axis (42) within the sphere of 90°. With this, a moving range of the abrasive tool (9) will be more spreaded, and a versatility and facility of the grinding work can both be ensured.

Figure 11:
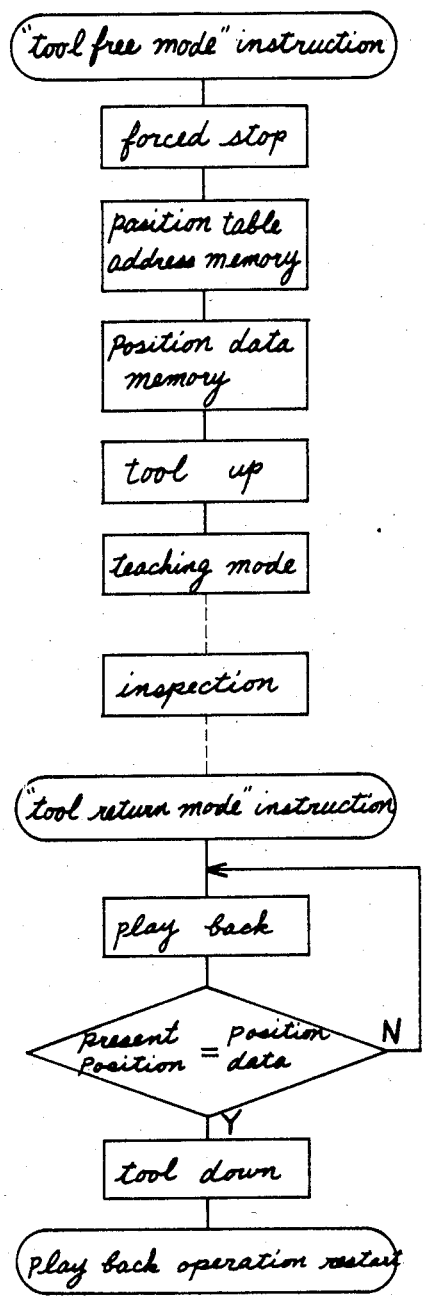
FIG. 11 is an operational flow chart of the grinding robot according to the present invention.

The present invention will then be explained in more detail as for a function of the tool retirement device by reference to the flow chart shown in FIG. 11.

If any need of inspection as for the ground result of the workpiece surface should arise in the course of playback operation, the operator must give an illustration to put the machine into "tool free mode" at an appropriate timing.

When the "tool free mode" instruction is given, the microprocessor unit (75) instantly reads out the lowest working speed data from the "SPEED" table irrespective of the variation volume of positional data accessed from the "POSITION" table and directly causes the motors (15) and (16) to decelerate and then brings them to a complete stop while subjecting to the "position feedback" order according to the present position's information incoming from the up-down counters (71a) and (71b).

After confirmation of the fact that the motors (15) and (16) came to a complete stop, the microprocessor (75) stores the addresses accessed from the "POSITION" table just at that time into the address register (78) and at the same time stores the positional data at that time into the data register (79), too.

Then, the microprocessor (75) gives an instruction to the fluid circuit (73) to supply a fluid into the ascending-/descending fluid-powered cylinder (39s) and to put the abrasive tool (9) "UP". After the abrasive tool (9) has completely been put "UP", the microprocessor (75) let the operator know of "the arm is ready to reoperate" and "the machine is ready to enter into teaching mode".

Then, the operator may retire the tool out of the working area while holding an end or tip or an appropriate edge of the tool securely and avoiding concaves-convexes on the workpiece surface or objections on the tool retirement course.

An internal mechanism of "POSITION" table (76) is assigned to prepare an area to store the data of retirement course of the tool (9). For example, let it be supposed that this area functions to initiate the writing of said data from an address "n". The microprocessor (75) will then write "n" in the address buffer (80) and continue to write the positional data of tool retirement course in an area subsequent to "n" in the "POSITION" table (76) synchronously with the emission of teaching clock pulse "TC".

That is, when the operator moves the abrasive tool (9) while holding its edge, the encoders (19) and (20) will emit the signals of count-up clock "UC" and count-down clock "DC", and the counted value of up-down counters (71a) and (71b) will be renewed according to these clock signals.

Once the teaching mode is initiated, the teaching clock signal "TC" will be issued and the microprocessor (75) will access the count values counted by the up-down counters (71a) and (71b) into its internal mechanism each time the teaching clock signal "TC" is issued and will write down the thus accessed count values in the "POSITION" table (76) while adding "1" each to an address number of the address buffer (80) every time the teaching clock signal "TC" is issued.

Accordingly, the positional data showing each point on the locus travelled at the time of tool retirement continues to be stored successively in an area subsequent to "n" in the "POSITION" table.

When the arm arrives to a final retirement position, the operator will naturally cease to move the abrasive tool, so that the encoders (19) and (20) will stop to emit their output powers and in consequence a counting action of the updown counters (71a) and (71b) is disabled. And, if the counting action of the up-down counters (71a, 71b) do not come to completely standstill notwithstanding a certain hour has lapsed away, the microprocessor (75) will then pass a judgment that the "teaching" mode is completed. And, if a value of the address buffer (80) is tentatively "n+1", the microprocessor (75) continues to stand by as its value was retained until a subsequent instruction is given.

While the microprocessor (75) is retaining the data on, the operator can carry out the inspection of the workpiece surface and, after completion of said inspection, give the "tool return mode" instruction to the microprocessor.

Then, when the microprocessor (75) receives the instruction of "tool return mode", it acts to give the address of "n+1" written in the "POSITION" table (76) which is retained during a term of the "tool free mode" and up to the termination of "teaching" mode into the address buffer (80), and then functions to read out the positional data from the "POSITION" table (76) while subtracting a value of "1" from the address buffer (80) every time the playback clock signal "PC" is issued.

In "ordinary playback" mode (i.e., "playback" mode during the grinding work), a value in the "SPEED" table (77) can be read out in accordance with the variation volume of positional data accessed from the "PO-SITION" table (76), however, in the "tool return" mode, the lowest instruction speed are read out of the "SPEED" table (77) irrespective of the variation volume of the positional data and applied to the motor drive units (71a) and (71b).

Accordingly, the abrasive tool (9) will come to return at the lowest velocity on the locus travelled in "tool free mode".

On the other hand, when the tool starts to return to the original position in this way, the encoders (19 & 20) will emit the count-up clock signal "UC" and the count-down clock signal "DC" in accordance with the rotation of No. 1 arm (7s) & No. 2 arm (8s) and the count values of the up-down counters (71a) and (71b) will be renewed according to the values of said count-up clock signal "UC" and count-dors (71a) and (71b) will be renewed according to the values of said count-up clock signal "UC" and count-down clock signal "DC". These values counted by up-down counters (71a) and (71b) are then given to the microprocessor (75) through the interface (74) and the microprocessor (75) functions to compare the present position given from said up-down counters (71a) and (71b) synchronously with the emission of the playback clock signal "PC" with an original position of the tool written in the data register (79).

And, when the present tool position accords with its original position, the microprocessor (75) acts to control the fluid circuit (73) to actuate the fluid-powered cylinder and causes the tool to descend.

Thus, when the abrasive tool (9) starts to descend, the microprocessor (75) gives an address stored in the address register (78) into an address buffer (80) and then, proceeds to an operation of the ordinary playback mode while adding a value of "1" to the address buffer (80) every time the playback clock signal "PC" is issued.

In the foregoing embodiment, though a structural example to make the abrasive tool (9) ascend or descend directly by the function of the fluid-powered cylinder (39s) has been described, it is also allowable to contrive to make the lift case (6) ascend or descend with the force of fluid-powered cylinder and thereby to make the power transmission mechanism (10S) and abrasive tool (9) ascend or descend.

As has been understood from the foregoing description, according to the present invention, the abrasive tool can freely be turned toward a given direction and automatically be moved toward a given direction, so that the grinding robot under the present invention is also possible to carry out a linearly reciprocating grind work and rotary grind work to the complicated curved-surface of the workpiece efficiently, not to speak of those of plane surface.

Also, according to the present invention, as it is possible to freely turn the table to the sphere of 360° and also to give an optional inclination of horizontal through perpendicular to the table, the workpiece surface can easily be opposed to the face of abrasive tool.

Further, as the workpiece is securely fixed on the table by the aid of lug link and the other linkage even when giving the inclination to the table, the workpiece is exactly held on the table without almost deflecting or slipping out of the position. Therefore, the positioning and moving controls of the abrasive tool are very facilitated and in consequence an efficiency of the grinding work is drastically enhanced as compared with that of the prior art.

Furthermore, an inclinatory direction of the table can freely be changed by means of the turntable, so that the movement of the abrasive tool can freely and simply be controlled in any kind of the grinding work. Thus, drastic effects and advantages are expected in the practical use of the present invention.

Moreover, according to the present invention, when retiring the tool in the course of grinding work, the tool is initially pushed up to its upper limit and then manually retired, so that the moving locus of the tool at the time of its retirement can be stored in the two-dimensional POSITION table without using three-dimensional POSITION table and the tool can thereby be put back to the original position in accordance with the thus stored locus. And, at the time of playback, the tool turns back onto the selfsame route as the moving locus at the time of retirement and descends from said upper limit to the original position where the grinding work was interrupted, so that the tool can return exactly to the original position without being disturbed by any obstructions on the course of return path or concaves and convexes on the workpiece surface.

However, it does not always follow that the present invention have to perform a sampling of a path for the tool at the time of tool retirement synchronously with the emission of clock signal as in the foregoing embodiment. But, as a teaching operation of the tool retirement path is sometimes carried out in the course of grinding work, it is required to do the teaching operation more faster than the ordinary one. Therefore, it is advisable to carry out a sampling of the tool retirement path quickly and synchronously with the emission of clock signal as in the foregoing embodiment. If so, a burden of the operator will be greatly lightened.

Having thus described this invention, it will be appreciated as mentioned herein that, when the invention is applied to the grinding work of 3-D curved-surface, the grinding robot under the present invention displays its full ability efficiently in the practical use by the simple structure and stable performance.

We claim:

1. A grinding robot having an abrasive tool for conducting the grinding work on a workpiece, and having a table device for holding the workpiece, and having a playback system to grind a three-dimensional curved-surface, comprising:
    a first arm being horizontally oscillatable around a vertical axis portion; said first arm having a head;
    a second arm pivoted to, and horizontally oscillatable to, said head of said first arm; said second arm having a head;
    a fluid cylinder attached perpendicularly to said head of said second arm;
    an abrasive tool attached to a bottom portion of said fluid cylinder for free movement in an ascendable direction and in a descendable direction, said abrasive tool being turnable relative to said bottom portion of said fluid cylinder.

2. The grinding robot of claim 1, wherein a work-holding table is freely turnable and is disposed opposite to said abrasive tool, said work-holding table being freely inclinable from a horizontal portion to a vertical position below said abrasive tool.

3. The grinding robot of claim 1, wherein said abrasive tool is constantly urged down perpendicularly relative to the workpiece to trace a three-dimensional curved-surface profile of the workpiece, thereby making automatic grinding of said three-dimensional curved-surface profile possible with the use of two-dimensional position data.

4. The grinding robot of claim 3, further comprising an abrasive tool emergency retirement device adapted to make it possible to playback-control the abrasive tool's retiring locus and to exactly return the abrasive tool to a position at a previous time of work interruption when retiring the abrasive tool temporarily in the course of playback work.

5. The grinding robot of claim 4, wherein a temporary retirement operation of the abrasive tool can be playback-controlled through an additional arrangement of "auxiliary area" for accessing the abrasive tool retirement locus data into a "two-dimensional position table" for storing the positional data of the abrasive tool.

* * * * *